Feb. 4, 1969  L. C. CLEMENT ET AL  3,425,274

FLOWMETER MEASURING SYSTEM

Filed March 30, 1966  Sheet 1 of 4

INVENTORS
LARRY C. CLEMENT
JACK HAMMAND
JACK R. HULME
CARL W. ZIMMERMAN

BY Burns, Doane, Benedict, Swecker & Mathis

ATTORNEYS

Feb. 4, 1969 L. C. CLEMENT ET AL 3,425,274
FLOWMETER MEASURING SYSTEM
Filed March 30, 1966 Sheet 2 of 4

INVENTORS
LARRY C. CLEMENT
JACK HAMMAND
JACK R. HULME
CARL W. ZIMMERMAN

BY
ATTORNEYS

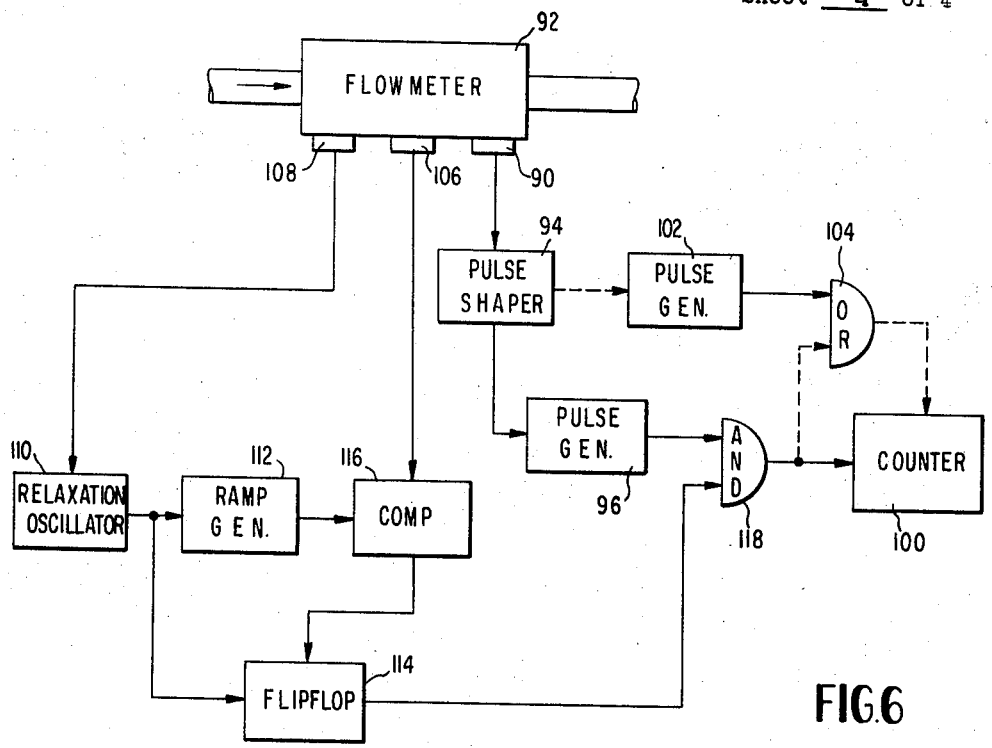
FIG.6
FIG.7
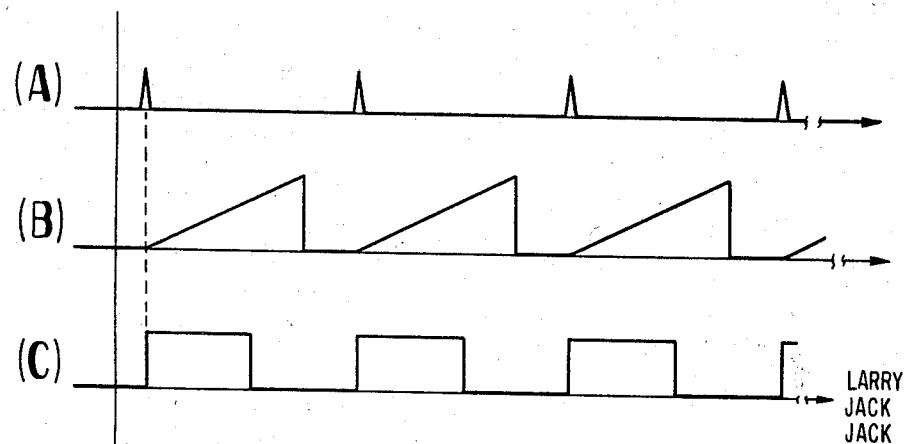

_United States Patent Office_

3,425,274
Patented Feb. 4, 1969

3,425,274
FLOWMETER MEASURING SYSTEM
Larry C. Clement, Jack Hammand, Jack R. Hulme, and Carl W. Zimmerman, Duncan, Okla., assignors to Halliburton Company, Duncan, Okla., a corporation of Delaware
Filed Mar. 30, 1966, Ser. No. 538,758
U.S. Cl. 73—194        11 Claims
Int. Cl. G01f 1/04

ABSTRACT OF THE DISCLOSURE

An electrical measuring system in which electrical pulses from a flowmeter are selectively gated to a counter in response to changes in a physical characteristic of the fluid. An indication of the rate of flow is available even during the intermittent interruption of the flow responsive signals by the gate. In a second embodiment the gating of the flow responsive pulses is controlled by a comparison of one fluid physical characteristic responsive signal with a time based signal initiated at a frequency related to a second physical characteristic of the fluid.

---

This invention relates to flowmeters and more particularly to systems for measuring a plurality of physical characteristics of the material flowing through a flowmeter.

Flowmeters which provide an indication of the rate of flow of a material, such as fluid passing through a pipeline, are well known. However, conventional flowmeters do not give accurate indications of the mass or quantity of material passing through the flowmeters when certain physical characteristics of the material, such as pressure or temperature, are changing. For this reason, systems have been heretofore developed to compensate the rate of flow measurement obtained from a flowmeter for changes in certain physical characteristics of material passing through the flowmeter.

Prior systems have for instance utilized mechanically movable elements for varying the flow signal from the flowmeter in accordance with changes in one or more physical characteristics of a flow stream. However, these systems have often been found to have relatively slow responses to changing physical characteristics of the flow through the flowmeter, and have often not produced satisfactorily accurate results. Further, the mechanical elements of these prior systems are subject to mechanical failure, thereby reducing the reliability of the systems.

Flowmeter compensation systems have been also heretofore developed which attempt to provide reliable operation by the utilization of electronic circuitry which periodically interrupts a series of electrical rate of flow pulses in accordance with changes in the magnitude of physical characteristics of the flow stream. These prior systems thus provide a series of groups of high frequency electrical pulses, with substantial periods of time between the groups of pulses in which no signal is provided to a suitable counting means. Systems of this type produce a very irregular indication of the rate of flow of material through a flowmeter whereby valuable information from the flowmeter is lost. Additionally, the irregular indication received by the counter causes fluctuation of the counter which often produces results not entirely satisfactory with respect to accuracy.

Accordingly, a general object of the present invention is the provision of a measuring system for use with a flowmeter which substantially eliminates or minimizes the disadvantages in flowmeter measuring systems heretofore available.

It is another object of the instant invention to provide a system for use with a flowmeter for varying the output of the flowmeter in accordance with changes in the magnitude of one or more physical characteristics of the material passing through the flowmeter.

Yet another object of this invention is the provision of a system for use with a flowmeter for providing a continuous indication of the rate of flow through the flowmeter while additionally compensating the indication of the rate of flow in accordance with changes in physical characteristics of the material passing through the flowmeter.

A further object of the present invention is the provision of a system utilizing electronic circuits with a flowmeter for automatically and continuously compensating the flow rate indications supplied by the flowmeter for changes in the magnitude of the physical characteristics of the material passing through the flowmeter.

The instant invention contemplates an electrical measuring system for use with a flowmeter which comprises a first transducer for providing an electrical signal to a counter representative of the rate of flow through the flowmeter. A second transducer means is also provided which is responsive to changes in physical characteristics of the material flowing past the flowmeter in order to vary the opening and closing of a gate disposed between the first transducer and the counter in order to intermittently interrupt the flow of certain of the electrical signals to the counter. Additional circuitry is provided to present an indication of the rate of flow from the first transducer to the counter even during the intermittent interruption of the flow of certain of the electrical signals from the first transducer to the counter. The instant invention thus comprises a very reliable automatic system for providing a continuous indication of the rate of flow through the flowmeter while also compensating the rate of flow indication for changes in physical characteristics of the flow stream.

The invention and its many advantages will be further understood by reference to the following detailed description illustrated in the accompanying drawings, in which:

FIGURE 6 is a circuit diagram of another embodiment of the present invention wherein the output of a flowmeter may be varied in accordance with changes in two different physical characteristics of material flowing through the flowmeter; and FIGURES 7A through 7C are a family of graphs representative of voltages at various points in the circuit of FIGURE 6.

Figure 1:
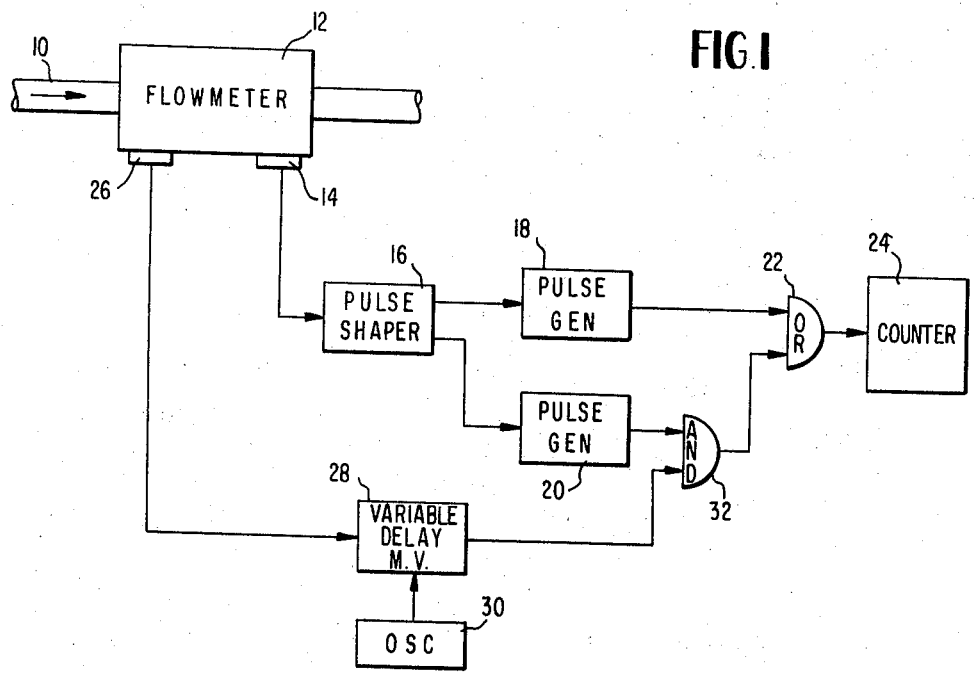
FIGURE 1 is a circuit diagram of one embodiment of the present invention in which the indication of the rate of flow through a flowmeter is varied in accordance with changes in one physical characteristic of the flow stream through the flowmeter.

Referring now to FIGURE 1, a fluid pipeline 10 is shown having a flowmeter 12 disposed therein. Flowmeter 12 may preferably be any of a plurality of turbine flowmeters well known in th art, wherein the fluid flow through the pipeline 10 causes a movable part to rotate at a rate proportional to the rate of fluid flow through the pipeline 10. A transducer 14, such as a magnetic pickup, is disposed adjacent the flowmeter 12 in order to produce an electrical signal which varies in accordance with the rate of movement of the flowmeter. This electrical signal representative of the rate of flow through the flowmeter 12 is fed to the pulse shaper circuit 16 which shapes the signal into two trains of square wave voltage outputs in order to provide accurate subsequent switching operations.

As shown in FIGURE 2A, a first voltage output produced by the pulse shaper 16 comprises a series of positive square wave pulses having a frequency directly proportional to the rate of flow through flowmeter 12. This first output voltage is fed to the pulse generator 18. The second output voltage produced by the pulse shaper 16 is illustrated in FIGURE 2B, and comprises a series of negative square wave pulses substantially similar to the first output voltage except for a polarity inversion. The second voltage signal has a frequency proportional to the rate of flow of material through the flowmeter 12 and is fed from pulse shaper 16 to the pulse generator 20.

The pulse generators 18 and 20 are biased to provide output voltage spikes upon the occurrence of predetermined characteristics of the output voltages provided by the pulse shaper 16. For instance, as shown in FIGURE 2C, the pulse generator 18 provides an output voltage spike upon the occurrence of the leading edge of each positive-going square wave pulse received from pulse shaper 16. Conversely, the pulse generator 20 provides a positive output voltage spike only upon the occurrence of the lagging edge of each negative-going voltage pulse, as shown in FIGURE 2D. Thus, the outputs of pulse generators 18 and 20 consist of two series of positive voltage pulses having essentially the same amplitude and frequency, but which are 180° out of phase with each other.

The spike voltages produced by the pulse generator 18 are fed into the OR gate 22 which provides an output pulse to counter 24 upon the occurrence of every input pulse. Counter 24 thus counts each positive spike voltage generated by the pulse generator 18 to provide a continuous indication of the rate of flow of the material flowing past the flowmeter 12.

A transducer 26 is additionally disposed adjacent the flowmeter 12 in order to provide an output which varies directly in response to changes in a predetermined physical characteristic of the flow path, such as pressure, temperature, density, or the like. For instance, in order to detect changes in temperature, a temperature sensitive probe which changes resistance in accordance with changes in temperature might be disposed in the flowmeter 12. This probe may employ a platinum or tungsten resistance thermometer, and may be used as part of the variable delay multivibrator circuit 28 in order to vary the time duration of the period of conduction of the multivibrator circuit in accordance with resistance variations produced by changes in the temperature of the fluid flowing through the flowmeter 12. An oscillator 30 provides a series of periodic trigger pulses, as shown in FIGURE 2E, which periodically initiates the unstable period of conduction of the variable delay multivibrator 28. Thus the time duration of the output pulses produced by the multivibrator 28, shown in FIGURE 2F, will vary directly with changes in the selected physical characteristic monitored by transducer 26.

Each output pulse provided by the multivibrator 28 (FIGURE 2F) is fed to a conventional AND gate 32 which also receives the output voltage spikes at a repetition rate representative of the flow rate produced by the pulse generator 20. As the AND gate 32 produces an output voltage of a magnitude proportional to the lowest voltage magnitude presented by an input voltage, gate 32 only passes output voltage spikes during the occurrence of each output pulse from the multivibrator 28, as illustrated in FIGURE 2G. Hence, the number of output voltage spikes from the pulse generator 20 passing through the AND gate 32 will be dependent upon the changes in the physical characteristic of the material passing through the flowmeter 12 as monitored by the transducer 26. To provide accuracy, the magnitude of the frequency of the oscillator 30 should be small with respect to the frequency of the voltage spikes produced by pulse generator 20.

The output voltage spikes allowed to pass through the AND gate 32 are fed to the OR gate 22 and the counter or rate indicator equipment 24. Counter 24 receives from pulse generator 20 a rate of flow signal intermittently interrupted in accordance with changes in a predetermined physical characteristic of the fluid flow, as well as a continuous indication of the rate of flow from pulse generator 18. As illustrated in FIGURE 2H, the indication received by the counter 24 is continuous without substantial periods of time with no input signal, thereby reducing fluctuation of the counter 24 and providing a reliable indication.

Figure 3:
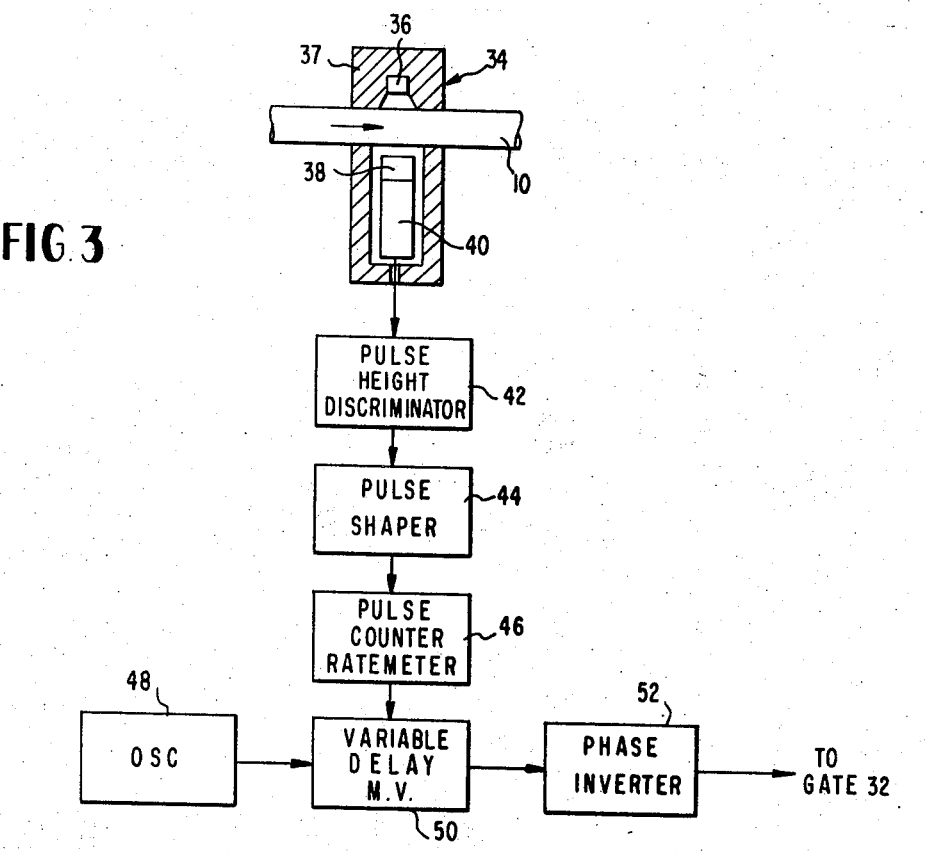
FIGURE 3 is a circuit diagram of a density transducer which may be used in conjunction with the circuit shown in FIGURE 1.

In place of a pressure or temperature responsive transducer 26, a transducer responsive to changes in the density of the material passing through the flowmeter 12 may be utilized in the circuit shown in FIGURE 1. For instance, as illustrated in FIGURE 3, a gamma radiation apparatus 34 may be disposed adjacent pipeline 10.

A radioactive gamma emitting source 36, such as radium or cobalt, may be enclosed by a shield 37 and disposed next to the pipeline 10 in order to irradiate the fluid flow. A scintillation crystal 38, which may be sodium iodide, is mounted in shield 37 opposite the gamma ray source 36 and is connected to a multiplier tube 40 in order to produce electrical signals upon the reception of radiation from source 36. As there is a direct relationship between the density of the material passing through pipeline 10 and its ability to absorb radiation, the number of electrical signals produced by the photomultiplier tube 40 is an inverse function of the density of the fluid passing through the pipeline 10.

Figure 4:
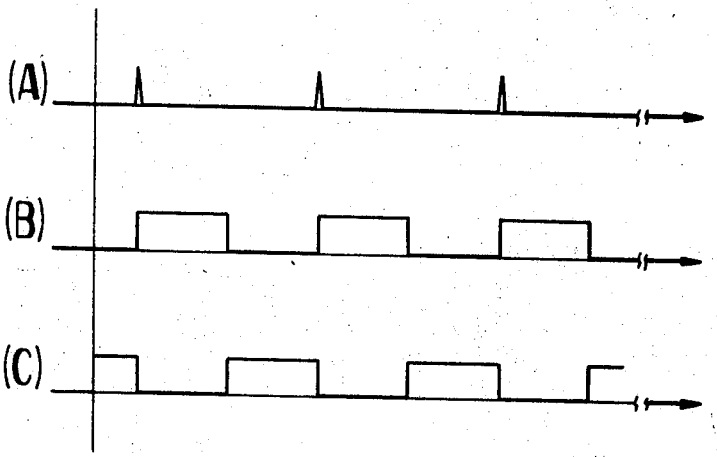
FIGURES 4A through 4C are a family of graphs illustrating voltage waveforms at various points in the circuit of FIGURE 3.

A pulse height discriminator 42 produces an electrical output pulse only upon the occurrence of electrical signals of a predetermined magnitude in order to eliminate false triggering of the subsequent gating apparatus. The pulse shaper 44 provides a series of shaped pulses having a frequency inverse to the density of the fluid in the pipeline 10. These pulses are fed to the pulse counter ratemeter 46, which in turn produces a direct current voltage level inverse to the density of the fluid in pipeline 10. A clock oscillator 48 provides a series of periodic trigger pulses, as shown in FIGURE 4A, which trigger an unstable period of conduction of a monostable multivibrator 50. The output from the ratemeter 46 is also fed to multivibrator 50, in order to vary the time duration of the unstable period of conduction of the multivibrator 50 in accordance with the direct current voltage level produced by the ratemeter 46 (FIGURE 4B). A suitable multivibrator circuit having a fast recovery time and capable of producing a pulse time duration proportional to the magnitude of a direct current control voltage is disclosed in the article entitled "A Linear, Voltage—Variable One-Shot With Fast Retrigger Time" by Richard S. Hughes, on pages 78–79 of EEE, May 1965.

The series of output pulses from multivibrator 50 is fed to the phase inverter 52 which produces an output voltage in inverse polarity, as seen in FIGURE 4C. The output from the phase inverter 52 is thus a series of positive voltage pulses having a time duration directly proportional to the density of the material passing through the pipeline 10. These voltage pulses may be utilized in the circuit shown in FIGURE 1 to control the AND gate 32 in order to intermittently interrupt the passage of the rate of flow pulses to the counter 24. It will be also understood that the circuit shown in FIGURE 3 may be utilized to provide an indication of the mass of the material passing through the flowmeter, as mass is proportional to the density multiplied by the volume of the material.

Figure 5:
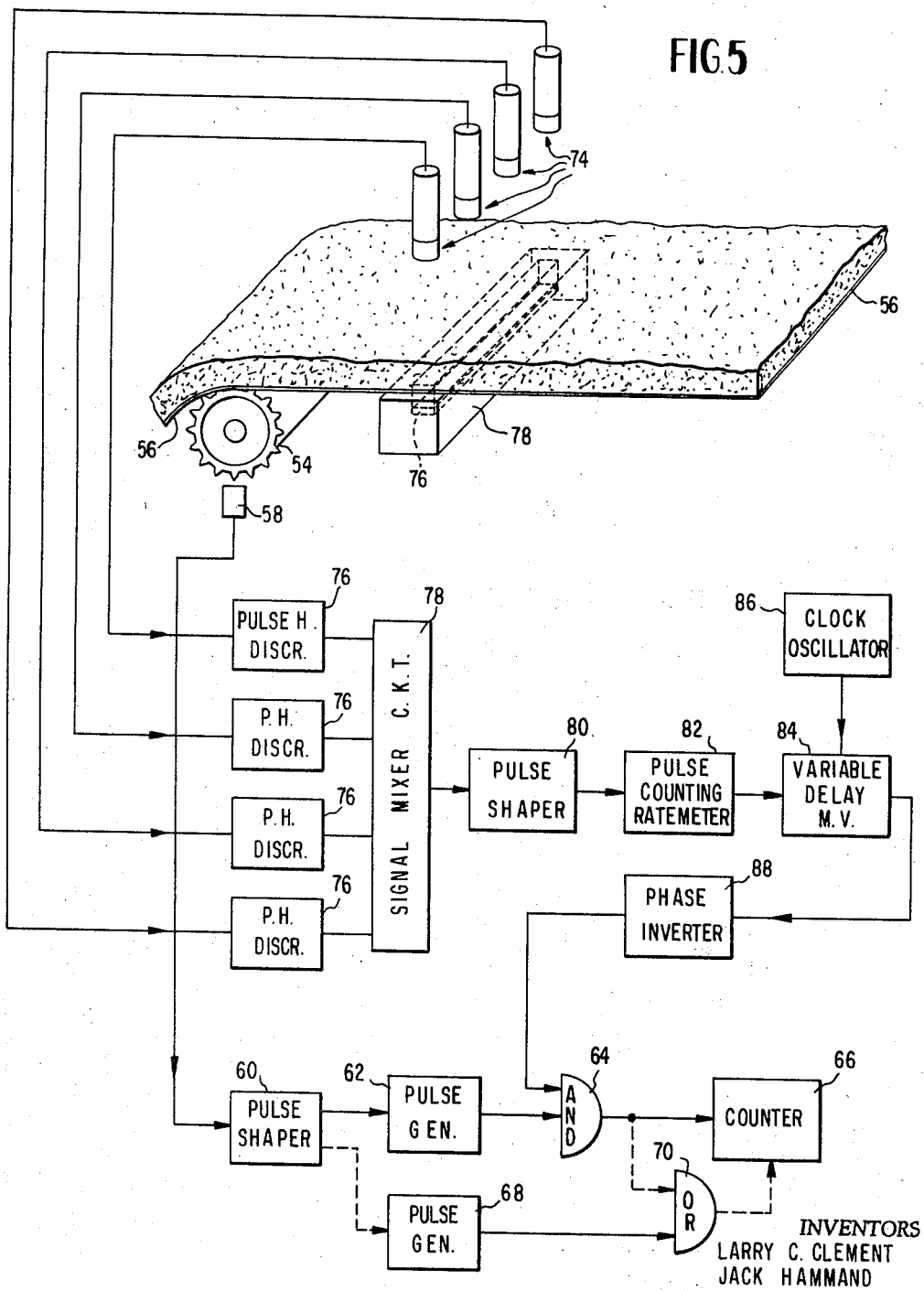
FIGURE 5 is a circuit diagram of a variation of the circuit shown in FIGURE 1.

In addition to utilizing the present invention in connection with a fluid flowmeter, the invention may be found useful in connection with a moving conveyor belt carrying granular or other dry materials, as shown in FIGURE 5. Wheel 54 rotates at a rate equal to the movement of the conveyor belt 56, and a transducer 58, such as a magnetic sensor, may be disposed adjacent the wheel 54 in order to provide an alternating electrical signal having a frequency proportional to the rate of travel of the conveyor belt 56. A pulse shaper 60 produces a first output pulse for every cycle of the alternating signal in order to enable accurate subsequent gating. A pulse generator 62 then provides a series of pulses in response to pulse shaper 60 and feeds the pulses through the AND gate 64 to the counter equipment 66.

Figure 2:
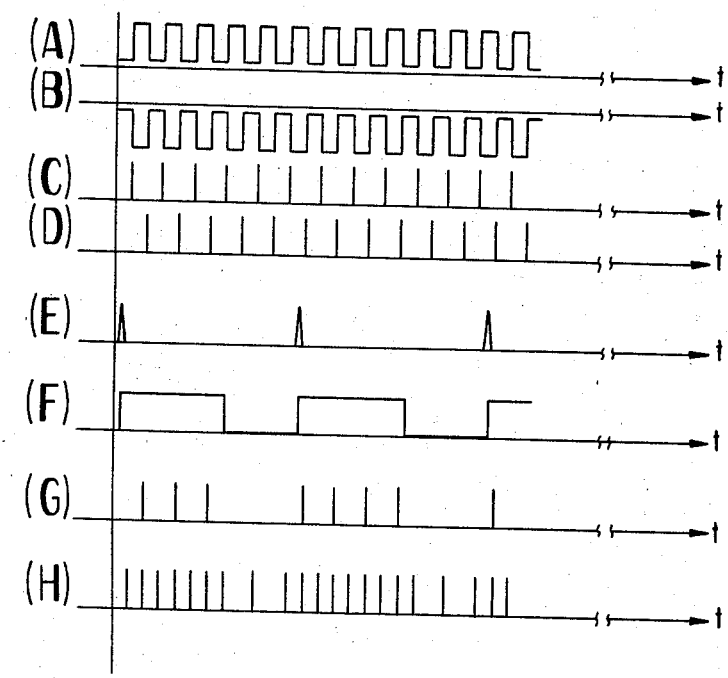
FIGURES 2A through 2H are a family of graphs illustrating the voltage waveforms at various points in the circuit of FIGURE 1.

If desired, a second pulse generator 68 and an OR gate 70 may be switched into the circuitry by suitable means in order to provide a continuous indication of the rate of flow as previously described with reference to FIGURES 1 and 2. As will be understood, a second series of output pulses appearing in time spaced relation to the first output pulses is required from pulse shaper 60 in this switched operation. A separate input may be utilized into counter 66 when the additional circuitry is being utilized, or separate counter equipment may be provided.

In order to intermittently interrupt the passage of the rate of flow signals in response to changes in the density of the material flow, a plurality of scintillation detectors 74 may be disposed adjacent the material carried on the conveyor belt 56 and opposite a distributed gamma ray source 76. The source 76 may be composed of any suitable material, such as radium or cesium 137, and may be surrounded by a shield 78. As the bulk material passing between the radiation source and the scintillation detector 74 absorbs radiation in a direct relationship to the density of the material, the scintillation detectors 74 produce electrical signals having frequencies inverse to the density of the portion of material directly under the detectors 74. A pulse height detector 76 is provided for each of the scintillation detectors 74 in order to pass only valid electrical signals to the signal mixer circuit 78. A cumulative signal is produced by the mixer circuit 78 which is inversely representative of the average density of the portion of the material flow present at a certain time under the scintillation detectors 74.

This signal is shaped into a series of square wave voltages by the pulse shaper 80, and fed to the pulse counting ratemeter 82, which in a manner similar to the circuitry shown in FIGURE 3, produces a direct current voltage having a magnitude inverse to the density of the material flow. Multivibrator 84 is triggered by the clock oscillator 86 to provide a series of output pulses having a time duration proportional to the voltage level of ratemeter 82. These output pulses are inverted by phase inverter 88 to present a series of pulses time-modulated by the density of the material flow. This train of pulses is fed to the AND gate 64 in order to intermittently interrupt the rate of flow signal for time durations dependent upon changes in the density of the granular material carried by the conveyor belt 56.

FIGURE 6 shows a circuit for providing a rate of flow signal compensated for changes in two different physical characteristics of the flow stream. In a manner similar to the apparatus described in connection with FIGURES 1 and 2, a first transducer 90 is disposed adjacent the flowmeter 92 to produce a signal proportional to the rate of flow of the fluid passing through the flometer 92. A pulse shaper 94, in connection with pulse generator 96, provides a series of output pulses having a frequency directly proportional to the flow rate to AND gate 98 and counter equipment 100. If desired, suitable switching means may be provided to selectively switch into the system a pulse generator 102 and an OR gate 104 in order to provide a continuous indication of the rate of flow to the counter equipment 100, as previously described with reference to FIGURES 1 and 2.

Additionally, disposed adjacent flowmeter 92 are second and third transducers 106 and 108, which may provide indications of such physical characteristics of the flow stream as pressure and temperature. Transducer 108 may include a resistance element, such as a platinum or tungsten thermometer or sensitor, which varies in electrical resistance directly in response to the temperature of the fluid. This varying resistance may be used as the resistance part of a resistor-capacitor time constant circuit in a relaxation oscillator circuit 110, in order to produce a series of trigger pulses (FIGURE 7A) having a frequency directly proportional to the temperature of the fluid passing through the flowmeter 92. These trigger pulses are fed both to a ramp generator 112 and to a conventional flip-flop multivibrator 114. Upon the occurrence of a trigger pulse, flip-flop circuit 114 is triggered into its conductive state (FIGURE 7C) and the pulse also initiates from the ramp generator 112 a positive-going ramp voltage (FIGURE 7B) which rises from zero potential and is fed to the comparator circuit 116.

Additionally, transducer 106 may provide an electrical signal voltage level to the comparator circuit 116 which varies linearly with the pressure of the fluid passing through the flowmeter 92. The comparator 116 provides an output signal only when the ramp voltage produced by the ramp generator 112 has risen to a magnitude equal to the magnitude of the voltage level being provided by the transducer 106. The output voltage (FIGURE 7C) produced by the conductive state of the flip-flop 114 continues until the comparator 116 produces an output signal and the flip-flop 114 is triggered back to its stable nonconductive state. Thus, the time duration of each output pulse produced by the flip-flop multivibrator 114 is directly proportional to the pressure of the fluid passing through the flowmeter 92. Each output pulse from the flip-flop 114 is triggered indirectly in response to transducer 108, consequently the frequency of the output pulses from the flip-flop circuit 114 is directly proportionate to the temperature sensed by the transducer 108. The output pulses shown in FIGURE 7C are then utilized to control the output of the AND gate 118 in order to intermittently interrupt the passage of the rate of flow signals to counter 100.

The total number of pulses received by the counter 100 will be proportional to the pressure of the fluid flow multiplied by the rate of flow indication from the flowmeter 92 and divided by the temperature of the flow stream passing through the flowmeter 92. As the rate of flow through the flowmeter 92 is proportional to the volume of the flow, the total number of pulses received by the counter 100 over a period of time multiplied by a suitable constant is then proportional to the mass of the fluid passing through the flowmeter 92 for the period of time.

It will be apparent to those skilled in the art that many variations are possible without departing from the concept and scope of the present invention. For instance, although the present invention has been described in connection with systems for compensating the rate of flow of material for variations in specifically designated physical characteristics, the instant apparatus is equally adaptable for computing other mathematical relationships between a flow rate and a variety of additional physical characteristics.

What is claimed is:

1. A rate of flowmeter system comprising:
   first transducer means operative in dependency on material velocity for providing a first pulsed electrical signal at a pulse frequency representative of the rate of flow,
   counter means operative in dependency on the pulsed signal for counting each of said first electrical signal pulses,
   circuit means operative in dependency on the output of the first transducer means to supply a second pulsed electrical signal whose pulses appear in time spaced relation to the first signal pulses,
   first gate means connected between said circuit means and said counter means for intermittently supplying said second pulsed signal to said counter means,
   second transducer means operative in dependency on a physical characteristic of the material to supply a third electrical signal varying with changes in the physical characteristic of the material,
   variable control means responsive to said third electrical signal for causing said gate means to supply certain of said second electrical signal pulses to said counter means for a time dependent upon the magnitude of said physical characteristic,
   the total number of electrical pulses counted by said counting means being representative of both the rate of material flow and of the magnitude of physical characteristic of the material.

2. The system of claim 1 further including wave shaping means responsive to said first transducer means to provide first and second pulse outputs at the same frequency and inverted polarity, and
   said counter means and circuit means each being selectively operative in dependency on one of said pulse outputs.

3. The system of claim 2 wherein said variable control means comprises oscillator means for providing a series of fixed frequency trigger pulses, and
   monostable multivibrator means responsive to the second transducer means and to said oscillator means for supplying a control pulse to said gate means in response to each of said trigger pulses from said oscillator means, said control pulse having a duration dependent upon the magnitude of the third electrical signal from the second transducer means.

4. The system of claim 3 further comprising:
   second gate means connected to said counter means to transmit signals thereto from the wave shaping means and from the first gate means.

5. The system of claim 1 wherein the second transducer means comprises:
   radiation means for providing an electrical signal representative of the density of the material.

6. The system of claim 5 wherein said radiation means comprises:
   radioactive source means for radiating the material,
   radiation receiving means responsive to the radiation from the source means after passing through the material for providing an electrical signal representative of the density of the material,
   pulse shaping means connected to said radiation receiving means for providing a series of electrical pulses having a frequency represenative of the density of the material, and
   ratemeter means responsive to said pulse shaping means for providing a voltage output inversely proportional to the density of the material for controlling the output of the variable control means.

7. The system of claim 6 wherein said variable control means comprises:
   oscillator means for providing a series of fixed frequency trigger pulses, and
   monostable multivbrator means responsive to the second transducer means and to said oscillator means for supplying a control pulse to said gate means in response to each of said trigger pulses from said oscillator means, said control pulse having a duration dependent upon the magnitude of the third electrical signal from the second transducer means.

8. The system of claim 7 wherein said radiation means includes:
   a plurality of radiation detectors, each of said detectors providing an electrical output selectively representative of the density of a different portion of the material, and
   electrical circuit means responsive to said electrical outputs for providing a single electrical output inversely representative of the average density of the material.

9. The system defined in claim 8 wherein said electrical circuit means comprises:
   pulse height discriminator means, and
   signal mixer means responsive to said discriminator means for providing said single electrical output to said pulse shaping means.

10. A rate of flowmeter system comprising:
    first transducer means operative in dependency on material velocity for providing a first pulsed electrical signal at a pulse frequency representative of the rate of flow,
    counter means for counting the first electrical signal pulses to provide an indication of the rate of material flow,
    first gate means connected between said transducer means and said counter means for intermittently supplying said electrical signals to said counter means,
    a second and a third transducer means operative in dependency on different physical characteristics of the material to provide electrical output signals selectively representative of two physical characteristics of the material,
    means responsive to said second transducer means for providing a series of ramp voltages having a frequency directly proportional to one of said physical characteristics of the material,
    comparator means responsive to said ramp voltages and to said electrical output signal from the third transducer means for providing an output pulse only when said ramp voltages reach the voltage magnitude of the signal provided by said third transducer means, and
    second means responsive to said comparator means and to said second transducer means for providing a series of output control pulses having a frequency directly proportional to the magnitude of the first-mentioned physical characteristic and having a time duration directly proportional to the magnitude of the other physical characteristic,
    said first gate means being responsive to said control pulses to supply said electrical signals to said counter means from the first transducer means during the persistence of each such output control pulse.

11. The system of claim 10 further comprising:
    pulse shaper means connected between said first transducer means and said first gate means for providing first and second series of electrical pulses at a pulse frequency representative of the rate of material flow,
    each pulse of said first series of electrical pulses being displaced in time to the corresponding pulse of the second series of electrical pulses.
    said gate means intermittently supplying said second series of electrical pulses to said counter means,
    said counter means continuously receiving said first series of electrical pulses, and
    second gate means responsive to the first series of electrical pulses and the output of said first gate means for providing a series of input pulses to said counter means having a frequency representative of the rate of material flow and the magnitudes of both said one and said other physical characteristics of the material.

References Cited

UNITED STATES PATENTS

| | | | |
|---|---|---|---|
| 3,160,811 | 12/1964 | Muniz et al. | 177—210 XR |
| 3,176,514 | 4/1965 | Foster | 73—229 |
| 3,184,975 | 5/1965 | Lindemann et al. | 73—229 XR |
| 3,278,747 | 10/1966 | Ohmart | 177—16 XR |

FOREIGN PATENTS 830,449  3/1960  Great Britain.

RICHARD C. QUEISSER, *Primary Examiner.*

C. A. RUEHL, *Assistant Examiner.*

U.S. Cl. X.R.

73—229